(12) United States Patent
Somadder et al.

(10) Patent No.: US 9,497,293 B2
(45) Date of Patent: Nov. 15, 2016

(54) MECHANISM FOR PAIRING USER'S SECONDARY CLIENT DEVICE WITH A DATA CENTER INTERACTING WITH THE USERS PRIMARY CLIENT DEVICE USING QR CODES

(71) Applicant: Google Inc., Mountain View, CA (US)

(72) Inventors: Gurudas Somadder, San Jose, CA (US); Haochen Liu, Sunnyvale, CA (US); Vinit Sudhakar Adkar, San Jose, CA (US)

(73) Assignee: Google Inc., Mountain View, CA (US)

( * ) Notice: Subject to any disclaimer, the term of this patent is extended or adjusted under 35 U.S.C. 154(b) by 185 days.

(21) Appl. No.: 14/220,035

(22) Filed: Mar. 19, 2014

(65) Prior Publication Data

US 2015/0271098 A1 Sep. 24, 2015

(51) Int. Cl.
*G06F 15/16* (2006.01)
*H04L 29/06* (2006.01)
*H04L 12/927* (2013.01)
*H04L 29/08* (2006.01)

(52) U.S. Cl.
CPC ............... *H04L 67/42* (2013.01); *H04L 63/00* (2013.01); *H04L 63/0853* (2013.01); *H04L 63/18* (2013.01); *H04L 47/80* (2013.01); *H04L 67/10* (2013.01)

(58) Field of Classification Search
CPC .............................. H04L 47/80; H04L 67/42
See application file for complete search history.

(56) References Cited

U.S. PATENT DOCUMENTS

| 8,010,977 | B2 * | 8/2011 | Hogyoku | G06Q 20/145 386/248 |
| 9,015,813 | B2 * | 4/2015 | Bicer | H04L 63/08 713/155 |
| 2012/0069036 | A1 | 3/2012 | Dharmapurikar | |
| 2012/0199647 | A1 * | 8/2012 | Hwang | G06Q 10/087 235/375 |
| 2013/0016107 | A1 | 1/2013 | Dharmapurikar | |
| 2013/0147819 | A1 | 6/2013 | Dharmapurikar | |
| 2013/0167208 | A1 * | 6/2013 | Shi | H04L 63/18 726/5 |
| 2013/0198794 | A1 | 8/2013 | Dharmapurikar | |
| 2014/0007211 | A1 * | 1/2014 | Yang | H04L 63/08 726/7 |
| 2014/0245388 | A1 * | 8/2014 | Nako | H04L 63/18 726/3 |
| 2015/0032578 | A1 * | 1/2015 | Bicer | H04L 63/08 705/26.82 |
| 2015/0215770 | A1 * | 7/2015 | Chan | H04W 12/04 455/456.1 |
| 2015/0237207 | A1 * | 8/2015 | Ordille | G06F 21/45 379/204.01 |
| 2015/0264050 | A1 * | 9/2015 | Neuman | H04L 63/08 713/155 |
| 2015/0278805 | A1 * | 10/2015 | Spencer, III | G06Q 20/382 705/44 |

\* cited by examiner

*Primary Examiner* — Moustafa M Meky
(74) *Attorney, Agent, or Firm* — Brake Hughes Bellermann LLP (57) ABSTRACT

A method for authenticating a user's secondary client device with a data center interacting with the user's primary client device includes capturing a quick response (QR) code displayed at the primary client device using the secondary client device, wherein the QR code is generated by the data center for the primary client device, analyzing the QR code at the secondary client device to extract information for initializing communication with the data center, providing information contained in the QR code to the data center by the secondary client device, wherein the information contained in the QR code is utilized by the data center to authenticate the secondary client device, and initializing interaction between the secondary client device and the data center when the data center authenticates the secondary client device.

26 Claims, 11 Drawing Sheets

MECHANISM FOR PAIRING USER'S SECONDARY CLIENT DEVICE WITH A DATA CENTER INTERACTING WITH THE USERS PRIMARY CLIENT DEVICE USING QR CODES

CROSS-REFERENCE TO RELATED APPLICATIONS

The present application is related to co-pending U.S. application Ser. No. 13/234,948, filed on Sep. 16, 2011, entitled "METHOD AND MECHANISM FOR DELIVERING APPLICATIONS OVER A WAN"; co-pending U.S. application Ser. No. 13/349,422, filed on Jan. 12, 2012, entitled "METHOD AND MECHANISM FOR PERFORMING BOTH SERVER-SIDE AND CLIENT-SIDE RENDERING OF VISUAL DATA"; co-pending U.S. application Ser. No. 13/491,930, filed on Jun. 8, 2012, entitled "METHOD AND MECHANISM FOR PERFORMING BOTH SERVER-SIDE AND CLIENT-SIDE RENDERING OF VISUAL DATA"; and co-pending U.S. application Ser. No. 13/558,163, filed on Jul. 25, 2012, entitled "METHOD AND MECHANISM FOR EFFICIENTLY DELIVERING VISUAL DATA ACROSS A NETWORK", which are hereby incorporated by reference in their entirety.

FIELD OF THE INVENTION

This invention relates to the field of remote content delivery, and in particular to a mechanism for providing remote content delivery to a secondary client device using quick response (QR) codes.

BACKGROUND

Remote content delivery is a mechanism often used in the context of gaming to allow a user operating a client device to interact with content being generated remotely. For example, a user may be operating a primary client device that interacts with a game running on a remote server. User inputs may be transmitted from the primary client device to the remote server, where content in the form of game instructions or graphics may be generated for transmission back to the primary client device. Such remote interaction between users and games may occur during actual gameplay as well as during game menu interfacing.

Situations may arise where a user of the primary client device may decide that they also want to utilize a secondary client device for interacting with the content. For example, a user may initially be operating a primary client such as a gaming console which is interacting with a game running on a remote server. The user may then decide that they would like to interact game using a secondary client device such as a phone or tablet.

Conventionally, in order to pair the secondary client device with the remote server running the game, the user of the secondary client device may be required to provide authentication in the form of a login/password combination or may alternatively create a local network between the secondary client device and the primary client device.

In some situations the user of the secondary client device may be unable to access authentication information (e.g., login information is hidden from the user of the device), and so pairing the secondary client device by means of authentication credentials may be unavailable. Additionally, creating a local area network between the secondary client device and the primary client device may be very cumbersome, and so pairing the secondary client device by means of creating a local area network may not be preferred.

Therefore, what is needed is an improved mechanism for pairing a secondary client device with the remote server running the game.

SUMMARY

According to some embodiments, a mechanism for pairing a user's secondary client device with a data center interacting with the user's primary client device using QR codes is described. A QR code generated by the data center and displayed at the user's primary client device is captured by the user's secondary client device. The QR code is then analyzed by the secondary client device to identify information for initializing communication with the data center. QR code information is also extracted from the QR code by the secondary client device and provided to the data center for authenticating the secondary client device. Upon authenticating the secondary client device, interaction between the secondary client device and the data center begins.

Further details of aspects, objects and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material or characteristic described in connection with the embodiments is included in at least one embodiment. Thus, the appearances of the phrase "in some embodiments" or "in other embodiments", in various places throughout this specification are not necessarily referring to the same embodiment or embodiments.

According to some embodiments, a mechanism for pairing a user's secondary client device with a data center interacting with the user's primary client device using QR codes is described. A QR code generated by the data center and displayed at the user's primary client device is captured by the user's secondary client device. The QR code is then analyzed by the secondary client device to identify information for initializing communication with the data center. QR code information is also extracted from the QR code by the secondary client device and provided to the data center for authenticating the secondary client device. Upon authenticating the secondary client device, interaction between the secondary client device and the data center begins.

In this way, the secondary client device may be paired to the data center without having to access authentication information and without having to create a local area network, thereby greatly simplifying the process for pairing the secondary client device to the data center.

Figure 1:
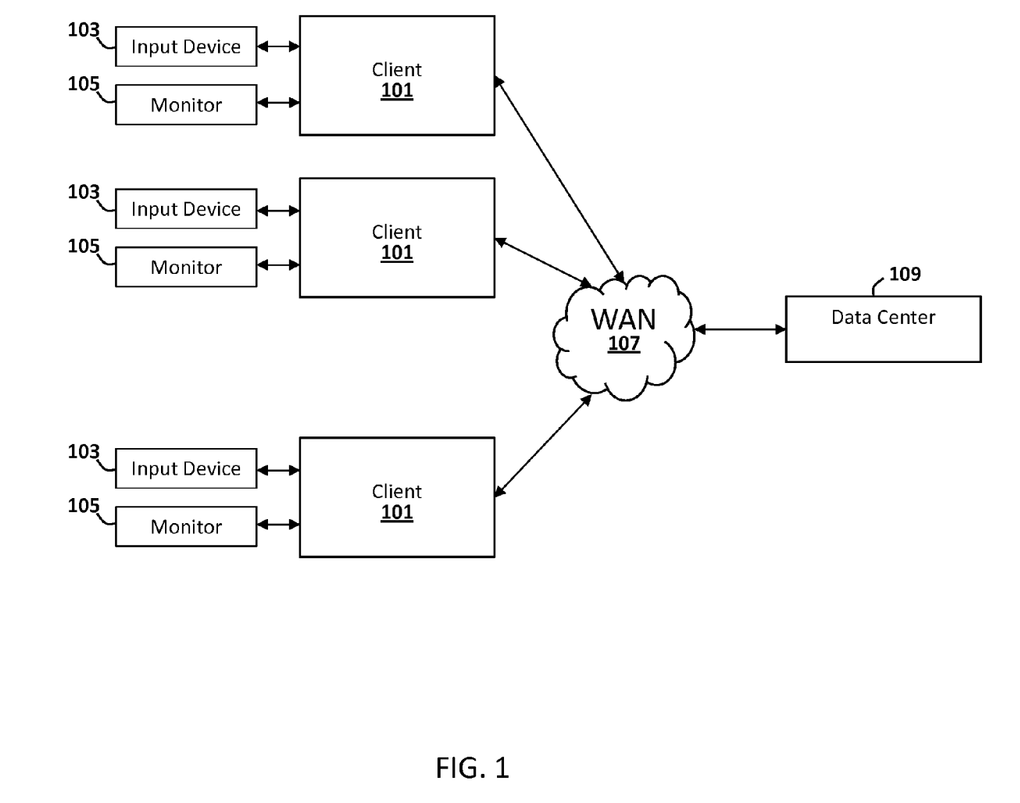
FIG. 1 illustrates an example system for remote content delivery.

Remote content delivery is a mechanism often used in the context of gaming to allow a user operating a client device to interact with content being generated remotely. FIG. 1 illustrates an example system 100 for remote content delivery. In the system 100 illustrated in FIG. 1, several client devices 101 interact with a remote server (e.g., data center) 109 over a network 107, such as a wide area network (WAN). The remote server 109 and client devices 101 may all be located in different geographical locations, and each client device 101 may interact with a different game program running at the remote server 109.

The client device 101 may be a set-top box (STB), mobile phone, thin gaming console, or any other type of device capable of communicating with the remote server 109. Each client device 101 may be associated with an input device 103 and a monitor 105. Such input devices may include keyboards, joysticks, game controllers, motion sensors, touchpads, etc. A client device 101 interacts with a game program running at the remove server 109 by sending inputs to the remote server 109 using its respective input device 103. Such interaction between users and games may occur during actual gameplay as well as during game menu interfacing.

Each game program is configured to interpret and respond to such input signals. User inputs may be transmitted from the client device 101 to the remote server 109, where content is generated for transmission back to the client device 101. The remote server 109 interprets the user input and generates content to be delivered to the client device 101 in response to the user inputs. Such content may take the form of game instructions for the client device 101 or rendered graphics for the client device 101. The generated content is then transmitted to the client device 101 where it is processed for display on the monitor 105.

Various mechanisms for remote content generation and delivery are available. Some approaches for implementing remote content generation and delivery in conjunction with the present invention are described in co-pending U.S. application Ser. No. 13/234,948; co-pending U.S. application Ser. No. 13/349,422; co-pending U.S. application Ser. No. 13/491,930; and co-pending U.S. application Ser. No. 13/558,163, which are hereby incorporated by reference in their entirety.

Situations may arise where a user of a primary client device that is interacting with the remote server may decide that they also want to utilize a secondary client device for interacting with the remote server. For example, a user may initially be operating a primary client device such as a gaming console which is interacting with a game running on a remote server. The user may then decide that they would also like to interact with the game at the remote server using a secondary client device such as a phone or tablet.

Figure 2:
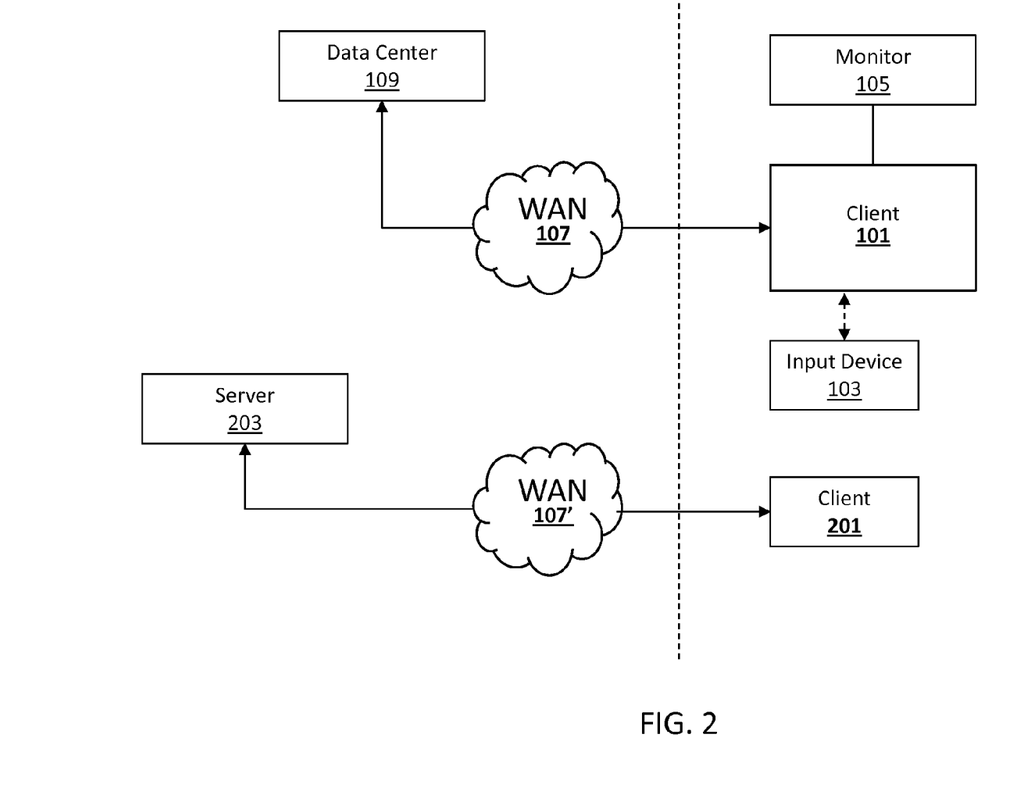
FIG. 2 is a schematic diagram illustrating a situation where a user has both a primary client device and a secondary client device.

FIG. 2 is a schematic diagram illustrating a situation where a user has both a primary client device and a secondary client device. In FIG. 2, a primary client device 101 of the user is configured to interact with a data center 109 over a first wide-area network (WAN) 107. As mentioned above, the primary client device 101 may be a set-top box (STB), mobile phone, thin gaming console, or any other type of device capable of communicating with the remote server 109. The primary client device 101 may also be associated with an input device 103 (e.g., keyboard, joystick, game controller, motion sensor, touchpad, etc.) and a monitor 105.

The primary client device 101 interacts with a game program running at the data center 109 by sending inputs to the remote server 109 using its respective input device 103 and receiving content from the data center 109 that is generated in response to the user input.

In FIG. 2, the user of the primary client device 101 also has a secondary client device 201. The secondary client device 201 may be any device having image capturing capability (e.g., smartphone with camera) that is capable of communicating with the data center 109. The secondary client device 107' may be running on a second wide area network (WAN) 107' that is different than the first WAN 107. For example, the primary client device 101 may be running on a gaming network, while the secondary client device 201 runs on a cellular network.

Situations may arise where the user of the primary client device 101 may decide that they also want to utilize their secondary client device 201 for interacting with the game running at the data center 109. Conventionally, in order to pair the secondary client device 201 with the data center 109 running the game, the user of the secondary client device 201 may be required to provide authentication in the form of a login/password combination or may alternatively create a local network between the secondary client device 201 and the primary client device 101.

However, these mechanisms are not preferred. This is because the user of the secondary client device may be unable to access authentication information (e.g., login information is hidden from the user of the device), and so pairing the secondary client device by means of authentication credentials may be unavailable. Additionally, having the user of the secondary client device create a local area network between the secondary client device and the primary client device may be very cumbersome, and so pairing the secondary client device by means of creating a local area network may not be preferred.

Therefore, what is needed is an improved mechanism for pairing a secondary client device with the remote server running the game. One mechanism for pairing the secondary client device with the data center running a game that the first client device is interacting with involves using quick response (QR) codes. QR codes are a type of matrix barcode that contain information about the item to which it is attached.

Figure 3:
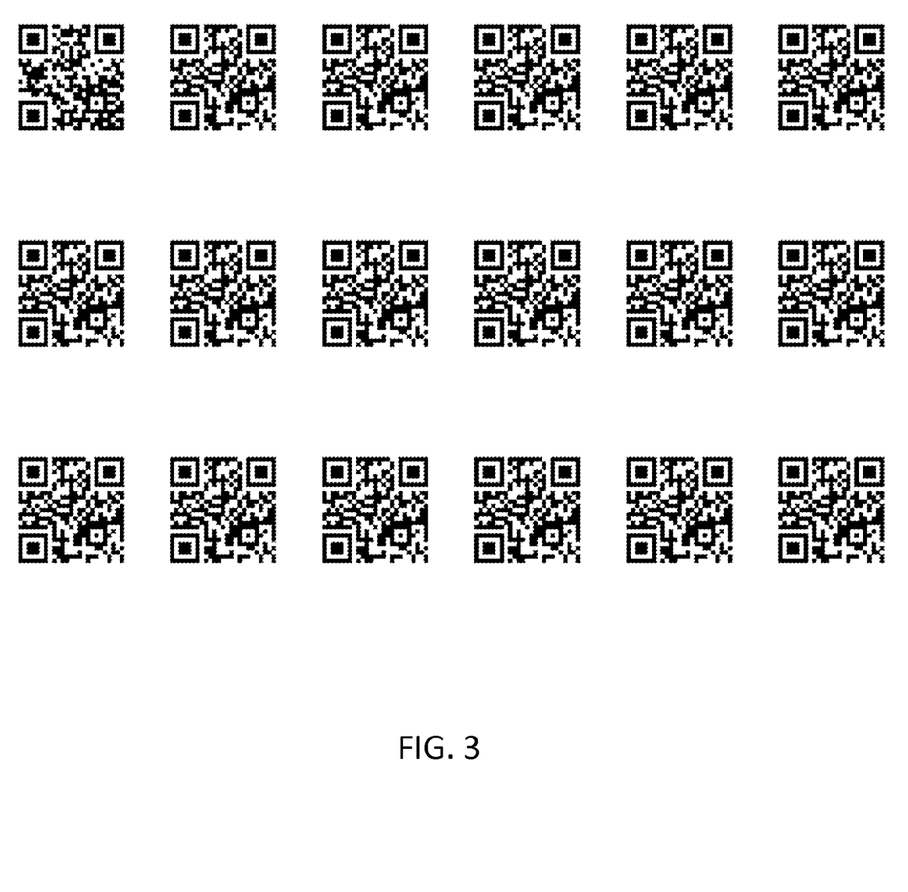
FIG. 3 illustrates several example QR codes.

FIG. 3 illustrates several example QR codes. A QR code consists of black modules (e.g., square dots) arranged in a square grid on a white background, which can be read by an imaging device (such as a camera) and processed using Reed-Solomon error correction until the image can be appropriately interpreted. Data is then extracted from patterns present in both horizontal and vertical components of the image and processed to identify the entity to which the QR code is attached. For example, a QR code may be attached to a website, such that a device that captures the QR code and extracts data from the QR code may be provided with a URL to the website.

Figure 4:
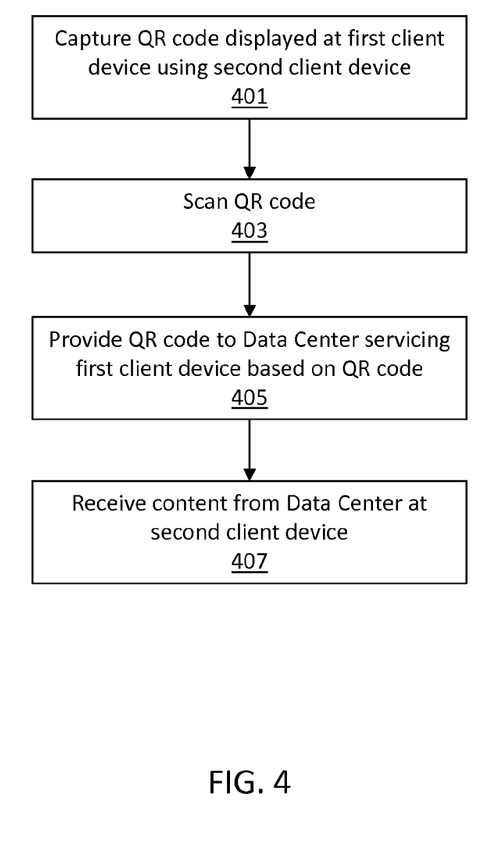
FIG. 4 is a flow diagram illustrating a method for pairing a user's secondary client device with a data center interacting with the user's primary client device.

Such QR codes may be utilized to quickly and efficiently pair secondary client devices with the data center in an authenticated manner. FIG. 4 is a flow diagram illustrating a method for pairing a user's secondary client device with a data center interacting with the user's primary client device. FIG. 4 is described from the perspective of the secondary client device.

Initially, a user may be utilizing a primary client device for interacting with a game running at a data center (e.g., remote server). The content generated by the data center is transmitted to the primary client device where it is displayed. The content may include a QR code that is displayed. The QR code includes unique information that is provided only to the user of the primary client device that may be utilized to provide a form of implied authentication for the user of the primary client device when attempting to pair a secondary client device to the data center, as will be discussed in greater detail below.

Upon receiving the content that includes a QR code, the user of the primary client device may capture the QR code displayed at the primary client device using the secondary client device as shown at 401. The secondary client device may be any device having image capturing capability that is capable of communicating with the data center, such as a smartphone or tablet.

The secondary client device preferably includes a QR code reader, for interpreting the information provided in the QR code. The QR code reader is capable of scanning the QR code, and extracting enough information from the QR code to initialize communication with the QR code generator (e.g., data center). For example, the QR code reader may perform an algorithm on the QR code to extract data from patterns present in both horizontal and vertical components of the image and processed to identify the entity to which the QR code is attached.

Thus, after capturing the QR code displayed at the primary client device using the secondary client device, the QR code may be analyzed as shown at 403. As mentioned above, analyzing the QR code involves scanning the QR code, and extracting enough information from the QR code to initialize communication with the QR code generator (e.g., data center). Here, the QR code captured includes information for initializing communication with the data center that initially provided the QR code. For example, the QR code may include information identifying an IP address at which that the data center may be reached. Alternatively, the QR code may include information for identifying an orchestrator server managing the data center that provided the QR code.

After analyzing the QR code at the secondary client device, the secondary client device may provide information included in the QR code to the data center as shown at 405. The secondary client device may initialize communication with the data center through the information extracted from the QR code. For example, where the QR code includes information identifying the IP address at which the data center may be reached, the secondary client device may initialize communication with the data center through that IP address. Alternatively, where the QR code includes information for identifying the orchestrator server managing the data center, the secondary client device may initialize communication with the data center using that information.

The information provided by the secondary client device may include the QR code itself. Because the QR code is unique to the user of the primary client device, providing the QR code to the data center allows the data center to authenticate the secondary client device. Alternatively, the information provided by the secondary client device may include unique information contained in the QR code that is displayed on the primary client device. Providing unique information contained in the QR code to the data center allows the data center to authenticate the secondary client device.

The data center verifies the QR code or QR code information provided by the secondary client device by comparing the QR code or QR code information provided by the secondary client device to the QR code or QR code information generated for the primary client device. When the QR code or QR code information provided by the secondary client device matches that generated for the primary client device, the data center is able to authenticate the secondary client device. This is because the secondary client device would only be able to capture the QR code or unique information contained in the QR code by being in the same location as the primary client device.

Once the data center has authenticated the secondary client device, the secondary client device may begin interacting with the data center as shown at 407. The secondary client device interacts with the data center in the same manner as the primary client device (e.g. by sending inputs to the data center and receiving content from the data center that is generated in response to the user input).

In some embodiments, the data center may terminate interaction with the primary client device once the secondary client device has been authenticated and interaction between the data center and secondary client device has occurred. In some embodiments, the data center may continue to interact with the primary client device once the secondary client device has been authenticated and interaction between the data center and secondary client device has occurred.

Utilizing QR codes to authenticate the secondary client device to allow the secondary client device to interact with the data center eliminates the need for the user of the secondary client device to access authentication information or create a local area network, thereby greatly simplifying the process for pairing the secondary client device to the data center.

Figure 5:
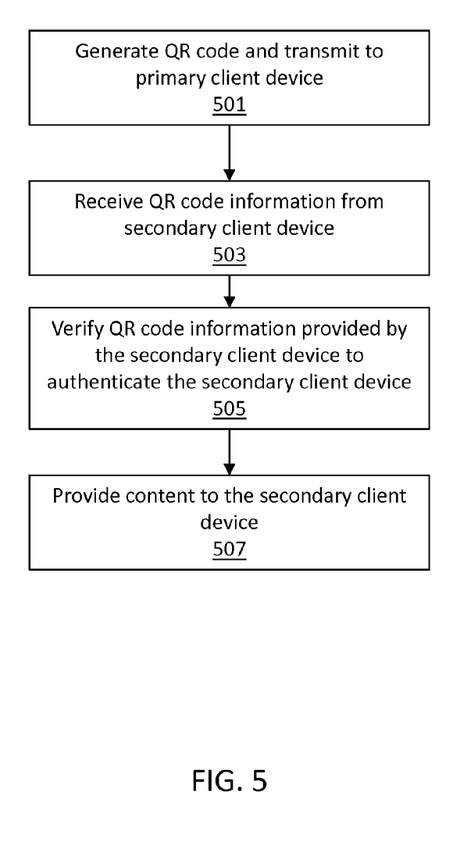
FIG. 5 is a flow diagram illustrating a method for pairing a user's secondary client device with a data center interacting with the user's primary client device.

FIG. 5 is a flow diagram illustrating a method for pairing a user's secondary client device with a data center interacting with the user's primary client device. FIG. 5 is illustrated from the perspective of the data center.

Initially, a user may be utilizing a primary client device for interacting with a game running at a data center (e.g., remote server). A QR code is generated by the data center and transmitted to the primary client device where it is displayed as shown at 501. The QR code may be included as a portion of the content that is provided by the data center to the primary client device. The QR code includes unique information that is provided only to the user of the primary client device that may be utilized to provide a form of implied authentication when attempting to pair a secondary client device to the data center.

Upon receiving the content that includes a QR code, the user of the primary client device may capture the QR code displayed at the primary client device using a QR code reader running on the secondary client device. After capturing the QR code displayed at the primary client device using the secondary client device, the QR code is analyzed by scanning the QR code and extracting enough information from the QR code to initialize communication with the QR code generator (e.g., data center). Here, the QR code captured includes information for initializing communication with the data center that initially provided the QR code. For example, the QR code may include information identifying an IP address at which that the data center may be reached. Alternatively, the QR code may include information for identifying an orchestrator server managing the data center that provided the QR code.

After analyzing the QR code at the secondary client device, the secondary client device may initialize communication with the data center to provide information included in the QR code to the data center. The secondary client device may initialize communication with the data center through the information extracted from the QR code.

The data center then receives the information included in the QR code from the secondary client devices as shown at 503. The information provided by the secondary client device may include the QR code itself. Because the QR code is unique to the user of the primary client device, providing the QR code to the data center allows the data center to authenticate the secondary client device. Alternatively, the information provided by the secondary client device may include unique information contained in the QR code that is displayed on the primary client device. Providing unique information contained in the QR code to the data center allows the data center to authenticate the secondary client device.

The data center then verifies the QR code or QR code information provided by the secondary client device to authenticate the secondary client device as shown at 505. The data center may verify the QR code or QR code information by comparing the QR code or QR code information provided by the secondary client device to the QR code or QR code information generated for the primary client device. When the QR code or QR code information provided by the secondary client device matches that generated for the primary client device, the data center is able to authenticate the secondary client device. This is because the secondary client device would only be able to capture the QR code or unique information contained in the QR code by being in the same location as the primary client device.

Once the data center has authenticated the secondary client device, the data center may begin providing content to the secondary client device as shown at 507. The secondary client device the proceeds to interact with the data center in the same manner as the primary client device (e.g. by sending inputs to the data center and receiving content from the data center that is generated in response to the user input).

In some embodiments, the data center may terminate interaction with the primary client device once the secondary client device has been authenticated and interaction between the data center and secondary client device has occurred. In some embodiments, the data center may continue to interact with the primary client device once the secondary client device has been authenticated and interaction between the data center and secondary client device has occurred.

As mentioned above, utilizing QR codes to authenticate the secondary client device to allow the secondary client device to interact with the data center eliminates the need for the user of the secondary client device to access authentication information or create a local area network, thereby greatly simplifying the process for pairing the secondary client device to the data center.

FIGS. 6A to 6E are schematic diagrams illustrating an example for a user's secondary client device with a data center interacting with the user's primary client device. In FIGS. 6A to 6E, a primary client device 101 of the user is configured to interact with a data center 109 over a first wide-area network (WAN) 107. The primary client device 101 is associated with an input device 103 (e.g., keyboard, joystick, game controller, motion sensor, touchpad, etc.) and a monitor 105.

The primary client device 101 interacts with a game program running at the data center 109 by sending inputs to the remote server 109 using its respective input device 103 and receiving content from the data center 109 that is generated in response to the user input.

In FIGS. 6A to 6E, the user of the primary client device 101 also has a secondary client device 201. The secondary client device 201 includes image capturing capability (e.g., smartphone with camera) and is capable of communicating with the data center 109. The secondary client device 107' runs on a second wide area network (WAN) 107' that is different than the first WAN 107.

Figure 6A:
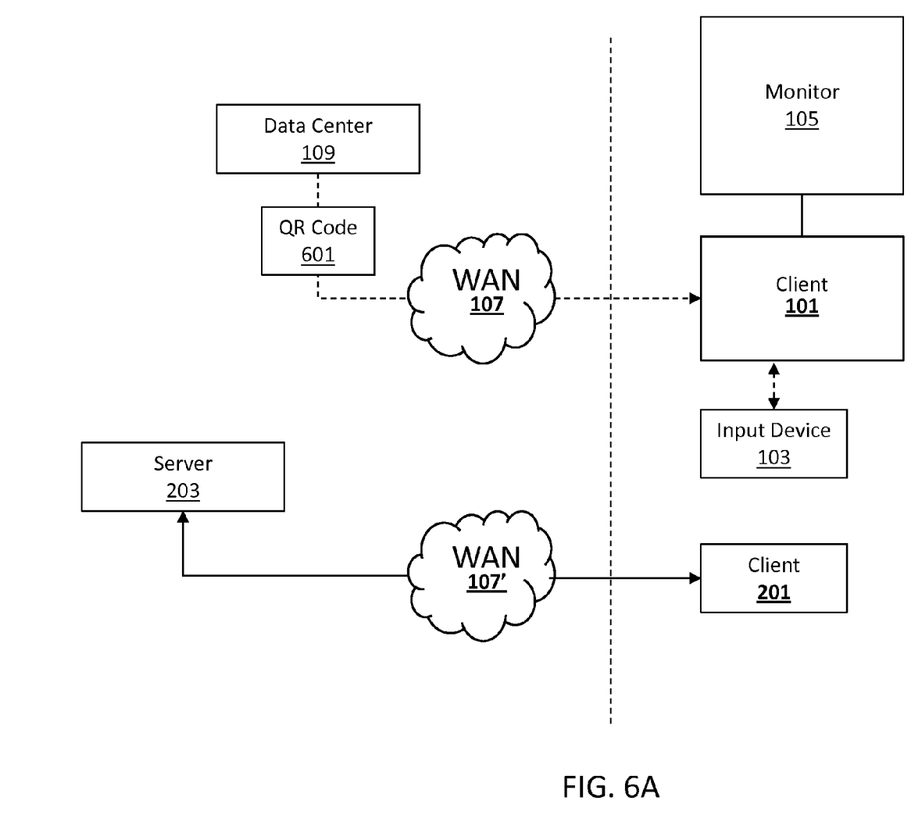
FIGS. 6A to 6E are schematic diagrams illustrating an example for a user's secondary client device with a data center interacting with the user's primary client device.
Figure 6B:
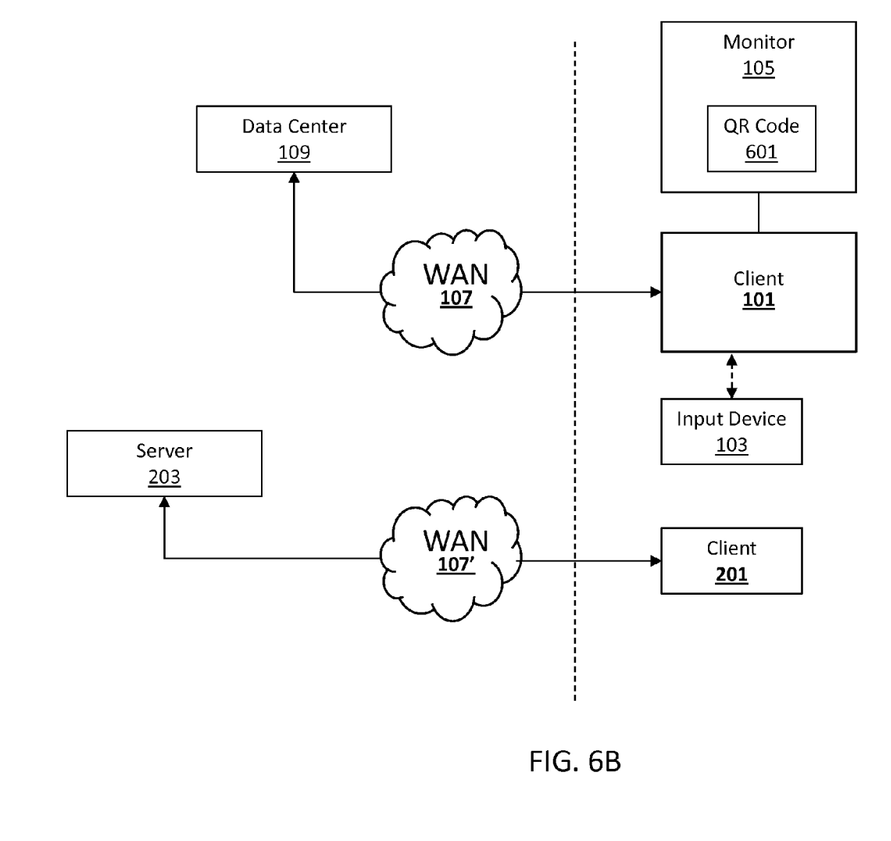

Initially, a user may be utilizing the primary client device 101 for interacting with a game running at the data center 109. A QR code 601 is generated by the data center 109 and transmitted to the primary client device 101 as shown in FIG. 6A and displayed on the monitor 105 associated with the client device 101 as shown in FIG. 6B. The QR code 601 may be included as a portion of the content that is provided by the data center 109 to the primary client device 101. The QR code 601 includes unique information that is provided only to the user of the primary client device 101 that may be utilized to provide a form of implied authentication when attempting to pair the secondary client device 201 to the data center 109.

Figure 6C:
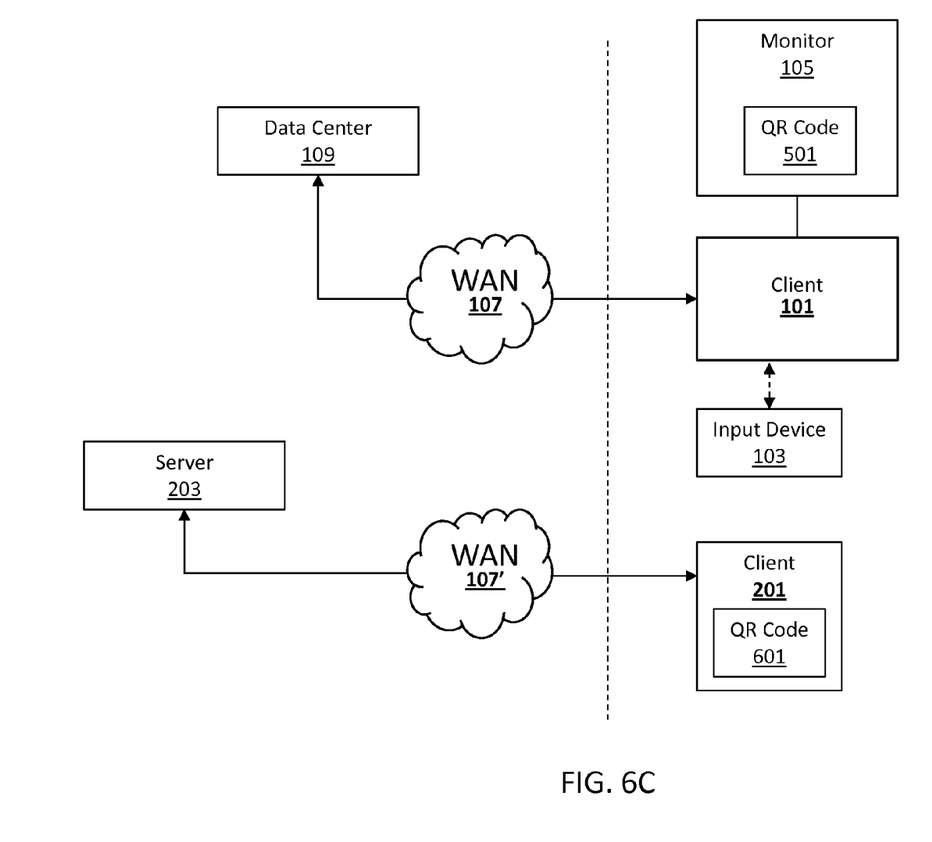

Upon receiving the content that includes the QR code 501, the user of the primary client device 101 may capture the QR code 601 displayed at the primary client device 101 using the secondary client device 501 as illustrated in FIG. 6C. The secondary client device may be any device having image capturing capability that is capable of communicating with the data center, such as a smartphone or tablet.

The secondary client device 501 includes a QR code reader (not shown), for interpreting the information provided in the QR code 501. The QR code reader is capable of scanning the QR code 501, and extracting enough information from the QR code 501 to initialize communication with the QR code generator (e.g., data center) 109. For example, the QR code reader may perform an algorithm on the QR code to extract data from patterns present in both horizontal and vertical components of the image and processed to identify the entity to which the QR code is attached.

Figure 6D:
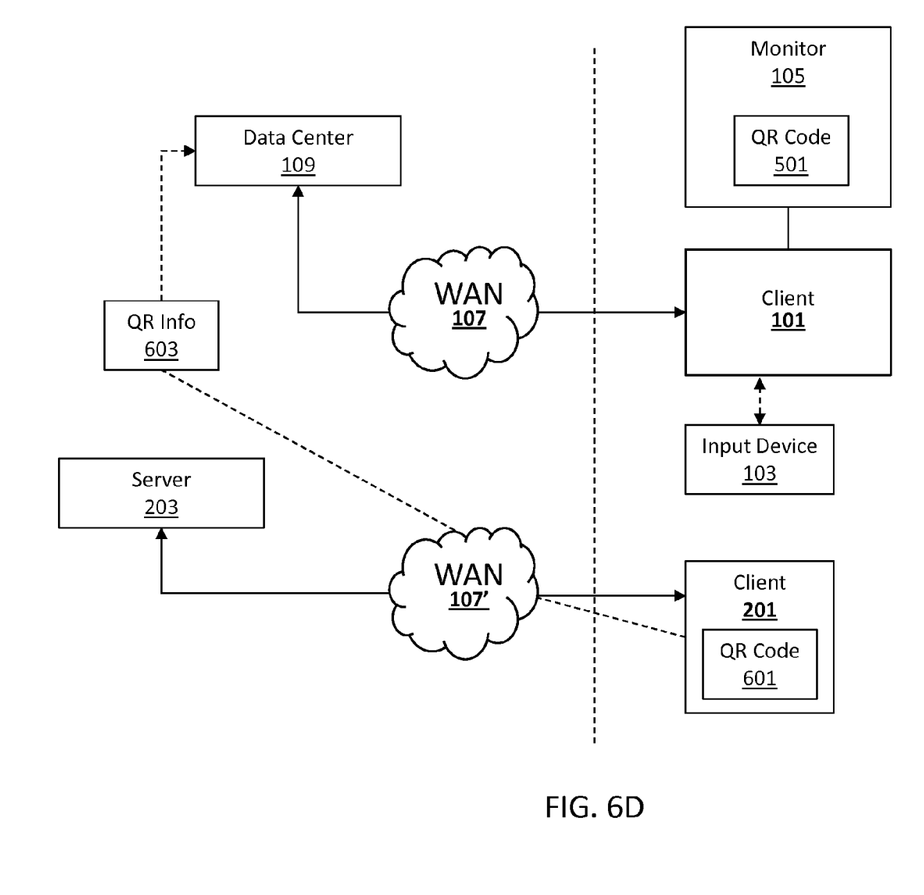

Thus, after capturing the QR code 501 displayed at the primary client device 101 using the secondary client device 201, the QR code 501 may be analyzed. As mentioned above, analyzing the QR code 501 involves scanning the QR code 501, and extracting enough information from the QR code 501 to initialize communication with the QR code generator (e.g., data center) 109. Here, the QR code 501 captured includes information for initializing communication with the data center 109 that initially provided the QR code. For example, the QR code may include information identifying an IP address at which that the data center may be reached. Alternatively, the QR code may include information for identifying an orchestrator server managing the data center that provided the QR code. For purposes of illustration, the example provided in FIGS. 6A-6E will demonstrate the situation where the QR code 501 includes information identifying an IP address at which that the data center 109 may be reached After analyzing the QR code 501 at the secondary client device 201, the secondary client device 201 may provide information included in the QR code 603 to the data center 109 as illustrated in FIG. 6D. The secondary client device 201 may initialize communication with the data center 109 through the information extracted from the QR code 501. In the example illustrated in FIGS. 6A to 6E, the QR code 601 includes information identifying the IP address at which the data center 109 may be reached and the secondary client device 601 initializes communication with the data center 109 through that IP address. However, it is important to note that alternatively, the QR code 601 may include information identifying an orchestrator server managing the data center 109 and the secondary client device 201 may initialize communication with the data center through the orchestrator.

For purposes of illustration, in the example illustrated in FIGS. 6A to 6E, the information 603 provided by the secondary client device 201 includes only a portion of unique information contained in the QR code 601 that is displayed on the primary client device 101. However, it is important to note that alternatively, the information provided by the secondary client device 201 may include the QR code 601 itself.

Because the QR code 601 is unique to the user of the primary client device 101, providing the unique QR code information 603 contained in the QR code 601 to the data center 109 allows the data center 109 to authenticate the secondary client device 201.

The data center 109 verifies the QR code information 603 provided by the secondary client device by comparing the QR code information 603 provided by the secondary client device to the QR code 601 generated for the primary client device 101. When the QR code information 603 provided by the secondary client device 201 matches a corresponding portion of the QR code 601 generated for the primary client device 101, the data center 109 is able to authenticate the secondary client device 201. This is because the secondary client device 201 would only be able to capture the unique information 603 contained in the QR code 601 by being in the same location as the primary client device 101.

Figure 6E:
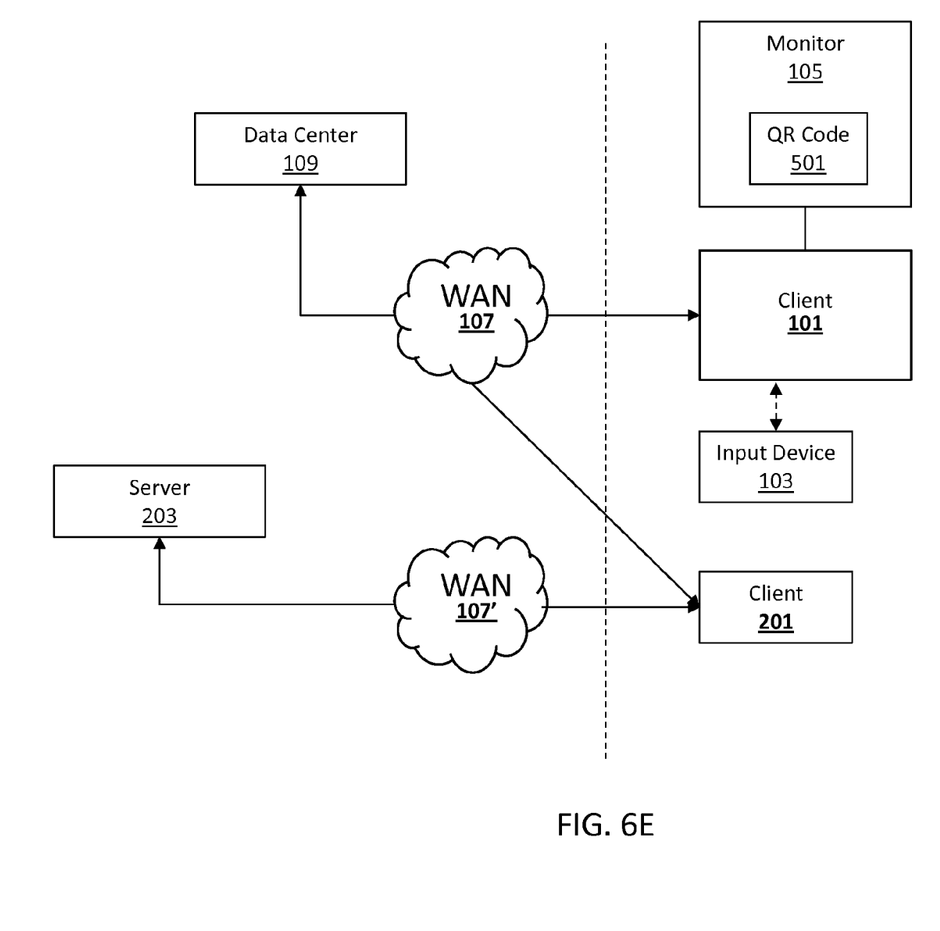

Once the data center 109 has authenticated the secondary client device 201, the secondary client device 201 begins interacting with the data center 109 as illustrated in FIG. 6E. The secondary client device 201 interacts with the data center 109 in the same manner as the primary client device 101 (e.g. by sending inputs to the data center 109 and receiving content from the data center 109 that is generated in response to the user input).

In FIG. 6E, the data center 109 continues to interact with the primary client device 101 once the secondary client device 201 has been authenticated and interaction between the data center 109 and secondary client device 201 has occurred. However, it is important to note that the data center 109 may instead terminate interaction with the primary client device 101 once the secondary client device 201 has been authenticated and interaction between the data center 109 and secondary client device 201 has occurred.

Utilizing QR codes to authenticate the secondary client device to allow the secondary client device to interact with the data center eliminates the need for the user of the secondary client device to access authentication information or create a local area network, thereby greatly simplifying the process for pairing the secondary client device to the data center.

System Architecture

Figure 7:
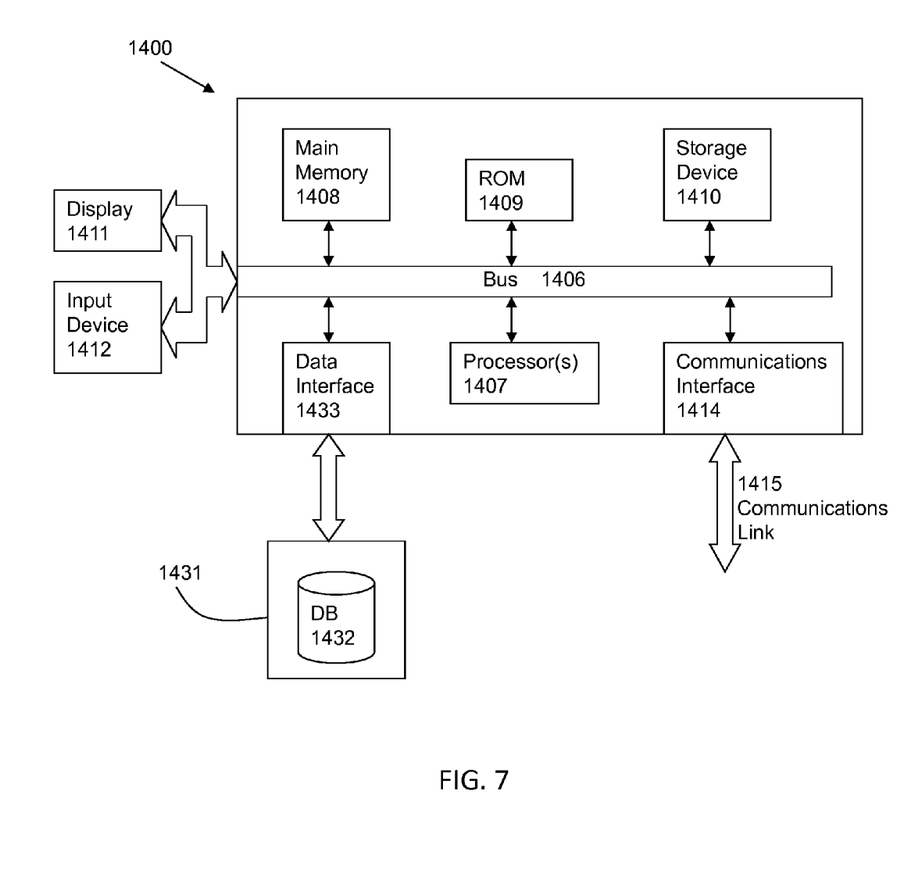
FIG. 7 is a block diagram of an illustrative computing system 1400 suitable for implementing an embodiment of the present invention.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for authenticating a user's secondary client device with a data center interacting with the user's primary client device, the method comprising:
    capturing a quick response (QR) code displayed at the primary client device using the secondary client device, wherein the QR code is generated by the data center for the primary client device and transmitted from the data center to the primary client device via a first network, the QR code including unique information provided only to the primary client device;
    analyzing the QR code at the secondary client device to extract information for initializing communication with the data center;
    providing information, extracted from the QR code by the secondary client device, from the secondary client device to the data center via a second network that is different from the first network, wherein the information extracted from the QR code by the secondary client device and provided to the data center is utilized by the data center to authenticate the secondary client device; and
    initializing interaction between the secondary client device and the data center after the data center compares the information extracted from the QR code and provided to the data center by the secondary client device, and authenticates the secondary client device based on the comparison, the interaction between the secondary client device and the data center being conducted via the first network.

2. The method of claim 1, wherein the secondary client device comprises a smartphone or tablet.

3. The method of claim 1, wherein analyzing the QR code comprises performing an algorithm on the QR code to extract data from patterns in horizontal and vertical components of the QR code.

4. The method of claim 1, wherein the information extracted for initializing communication with the data center comprises an IP address of the data center.

5. The method of claim 1, wherein the information extracted for initializing communication with the data center comprises information identifying an orchestrator server managing the data center.

6. The method of claim 1, wherein providing information, extracted from the QR code by the secondary client device, from the secondary client device to the data center comprises providing the entire QR code.

7. The method of claim 1, wherein providing information, extracted from the QR code by the secondary client device, from the secondary client device to the data center comprises providing the unique information contained in the QR code.

8. The method of claim 1, further comprising:
    terminating interaction between the data center and the primary client device when the data center authenticates the secondary client device.

9. A computer program product embodied on a computer readable medium, the computer readable medium having stored thereon a sequence of instructions which, when executed by a processor causes the processor to execute a method for authenticating a user's secondary client device with a data center interacting with the user's primary client device, comprising:
    capturing a quick response (QR) code displayed at the primary client device using the secondary client device, wherein the QR code is generated by the data center for the primary client device and transmitted from the data center to the primary client device via a first network, the QR code including unique information provided only to the primary client device;
    analyzing the QR code at the secondary client device to extract information for initializing communication with the data center;
    providing information, extracted from the QR code by the secondary client device, from the secondary client device to the data center via a second network that is different from the first network, wherein the information extracted from the QR code by the secondary client device and provided to the data center is utilized by the data center to authenticate the secondary client device; and
    initializing interaction between the secondary client device and the data center after the data center compares the information extracted from the QR code and provided to the data center by the secondary client device, and authenticates the secondary client device based on the comparison, the interaction between the secondary client device and the data center being conducted via the first network.

10. The computer program product of claim 9, wherein the secondary client device comprises a smartphone or tablet.

11. The computer program product of claim 9, wherein analyzing the QR code comprises performing an algorithm on the QR code to extract data from patterns in horizontal and vertical components of the QR code.

12. The computer program product of claim 9, wherein the information extracted for initializing communication with the data center comprises an IP address of the data center.

13. The computer program product of claim 9, wherein the information extracted for initializing communication with the data center comprises information identifying an orchestrator server managing the data center.

14. The computer program product of claim 9, wherein providing information, extracted from the QR code by the secondary client device, from the secondary client device to the data center comprises providing the entire QR code.

15. The computer program product of claim 9, wherein providing information, extracted from the QR code by the secondary client device, from the secondary client device to the data center comprises providing the unique information contained in the QR code.

16. The computer program product of claim 9, further comprising:
    terminating interaction between the data center and the primary client device when the data center authenticates the secondary client device.

17. A method for authenticating a user's secondary client device with a data center interacting with the user's primary client device, comprising:
    generating, at the data center, a QR code and transmitting the QR code from the data center to the primary client device via a first network for display at the primary client device, the QR code including unique information provided only to the primary client device;

receiving, at the data center, the unique information contained in the QR code from the secondary client device, the unique information contained in the QR code being transmitted from the secondary client device to the data center via a second network that is different from the first network;

verifying, by the data center, the received unique information contained in the QR code corresponds to the unique information provided only to the primary client device to authenticate the secondary client device; and initializing interaction with the secondary client device by the data center after verifying the unique information contained in the QR code and authenticating the secondary client device, the interaction between the secondary client device and the data center being conducted via the first network.

18. The method of claim 17, wherein the secondary client device comprises a smartphone or tablet.

19. The method of claim 17, wherein receiving the unique information contained in the QR code from the secondary client device comprises receiving the entire QR code.

20. The method of claim 17, wherein verifying the received unique information contained in the QR code comprises comparing the received unique information contained in the QR code to the unique information included in the generated QR code.

21. The method of claim 17, further comprising:
terminating interaction between the data center and the primary client device when the data center authenticates the secondary client device.

22. A computer program product embodied on a computer readable medium, the computer readable medium having stored thereon a sequence of instructions which, when executed by a processor causes the processor to execute a method for authenticating a user's secondary client device with a data center interacting with the user's primary client device, comprising:

generating, at the data center, a QR code and transmitting the QR code from the data center to the primary client device via a first network for display at the primary client device, the QR code including unique information provided only to the primary client device;

receiving, at the data center, the unique information contained in the QR code from the secondary client device, the unique information contained in the QR code being transmitted from the secondary client device to the data center via a second network that is different from the first network;

verifying, by the data center, the received unique information contained in the QR code corresponds to the unique information provided only to the primary client device to authenticate the secondary client device; and initializing interaction with the secondary client device by the data center after verifying the unique information contained in the QR code and authenticating the secondary client device, the interaction between the secondary client device and the data center being conducted via the first network.

23. The computer program product of claim 22, wherein the secondary client device comprises a smartphone or tablet.

24. The computer program product of claim 22, wherein receiving the unique information contained in the QR code from the secondary client device comprises receiving the entire QR code.

25. The computer program product of claim 22, wherein verifying the received unique information contained in the QR code comprises comparing the received unique information contained in the QR code to the unique information included in the generated QR code.

26. The computer program product of claim 22, further comprising:
terminating interaction between the data center and the primary client device when the data center authenticates the secondary client device.

\* \* \* \* \*